US007128690B2

United States Patent
Inoue et al.

(10) Patent No.: US 7,128,690 B2
(45) Date of Patent: Oct. 31, 2006

(54) METHOD FOR CONTROLLING MAGNET TYPE FAN CLUTCH

(75) Inventors: Hiroshi Inoue, Numazu (JP); Ken Shiozaki, Susono (JP)

(73) Assignee: Usui Kokusai Sangyo Kaisha Limited (JP)

( * ) Notice: Subject to any disclaimer, the term of this patent is extended or adjusted under 35 U.S.C. 154(b) by 210 days.

(21) Appl. No.: 10/864,842

(22) Filed: Jun. 9, 2004

(65) Prior Publication Data

US 2005/0124461 A1    Jun. 9, 2005

(30) Foreign Application Priority Data

Jun. 12, 2003    (JP)    ............................. 2003-168312

(51) Int. Cl.
*B60W 10/02* (2006.01)

(52) U.S. Cl. ................. 477/175; 477/176; 477/180

(58) Field of Classification Search ................. 477/174, 477/175, 176, 180; 192/48.2, 84.31; 310/103, 310/105

See application file for complete search history.

(56) References Cited

U.S. PATENT DOCUMENTS

| 3,924,585 | A | * | 12/1975 | Woods ................... 192/84.961 |
| 4,715,482 | A | * | 12/1987 | Watanabe et al. ........... 477/175 |
| 6,082,316 | A | * | 7/2000 | Ban et al. ............. 123/142.5 R |
| 6,247,567 | B1 | | 6/2001 | Watanabe |
| 6,634,476 | B1 | | 10/2003 | Inoue et al. |
| 6,878,094 | B1 | * | 4/2005 | Kitamura et al. ............... 477/5 |

* cited by examiner

*Primary Examiner*—Ha Ho
(74) *Attorney, Agent, or Firm*—Gerald E. Hespos; Anthony J. Casella

(57) ABSTRACT

Provided is a method for controlling a magnet type fan clutch, by which method engine performance, fuel efficiency, engine life, vehicle acceleration capability and other properties of a magnet type fan clutch can be further improved and its fan noise can be further reduced. This method is adopted for controlling a magnet type fan clutch which includes a magnet coupling, an electromagnetic clutch combined with the magnet coupling to control the on/off switching of the magnet coupling, and a fan attached to the magnet coupling. The control method is characterized in that the electromagnetic clutch is turned on or off based on at least one signal of temperatures of radiator coolant, engine oil and transmission oil, a vehicle speed, a rotational speed of an engine, compressor pressure of an air conditioner, and an on/off signal of the air conditioner, etc., so as to control the rotation of the fan.

3 Claims, 4 Drawing Sheets

METHOD FOR CONTROLLING MAGNET TYPE FAN CLUTCH

TECHNICAL FIELD

The present invention relates to a method for controlling a magnet type fan clutch which rotationally controls a cooling fan chiefly employed for an internal combustion engine for a vehicle, and more particularly to a method for controlling a magnet type fan clutch in which a magnet coupling and an electromagnetic clutch are combined such that the on/off switching of the magnet coupling can be controlled by the electromagnetic clutch.

BACKGROUND ART

As a magnet type fan clutch which rotationally controls a cooling fan used for an internal combustion engine for a vehicle, a viscous fluid coupling which receives driving torque from a vehicle engine and transmits output driving torque to a radiator cooling fan and a method for controlling the viscous fluid coupling have been disclosed (see JP-A-9-119455). According to a mechanism of the viscous fluid coupling, a valve is opened and closed by deformation of bimetal which reacts to temperatures of air flowing through a radiator, thereby varying oil supply amounts and thus altering fan rotations. More specifically, this mechanism aims at prevention of fan noise and slip heat which are produced in a low idling condition at the time of vehicle stop, and comprises steps of: detecting a rotational speed of a vehicle engine; comparing the measured value with a limit value established in advance; detecting a rotational speed of a radiator cooling fan when the rotational speed of the engine is smaller than the limit value; comparing the fan speed with a predetermined fan speed limit value; and correcting an input signal to shift a valve member to a closing position when the fan speed is larger than the limit value.

DISCLOSURE OF INVENTION

However, the above-described method for controlling the viscous fluid coupling, in which the valve is opened and closed by deformation of the bimetal reacting to temperatures of air flowing through the radiator to vary the oil supply amounts and thus alter the fan rotations, has several drawbacks. Since the temperature of engine coolant which affects the capability of cooling the engine cannot be directly controlled, the following points result: power loss caused due to unnecessary fan rotation lowers fuel efficiency; preferable fan rotation for cooling a condenser of an air conditioner (A/C) cannot be maintained; fan noise generated due to unnecessary fan rotation caused at the time of acceleration cannot be prevented and other points.

Therefore, in order to overcome the drawbacks of the above-described cooling control method which depends on the temperatures of air flowing through the radiator, the applicant of the present invention previously proposed an external control type fan clutch which is capable of improving engine performance and fuel efficiency, enhancing cooling capability of an air conditioner (A/C) condenser, and preventing fan noise produced due to fan rotation at the time of acceleration (see JP-A-2002-195303, JP-A-2003-156072 and other reference) This external control type fan clutch is provided with a magnet coupling, an electromagnetic clutch integrally combined with the magnet coupling, and a fan attached to the magnet coupling, and on/off switching of the magnet coupling is controlled by the electromagnetic clutch. More specifically, the external control type fan clutch includes, for example: a rotative electromagnetic clutch having a clutch rotor in which an exciting coil supported on both a drive shaft and an external member is incorporated and an armature attached to a disc which is rotationally supported on the drive shaft via a bearing unit; and a magnet coupling having a permanent magnet rotating member which is rotationally supported on the drive shaft via the bearing unit, a fan attached to the outer surface of the permanent magnet rotating member, and a hysteresis material or a conductor attached to the disc in such a position that the hysteresis material or the conductor is opposed to the permanent magnet leaving a small gap there between, wherein the permanent magnet rotating member and the disc rotate integrally or relatively due to suctional effect generated between the permanent magnet and the hysteresis material or the conductor. In the external control type fan clutch having this structure or other, the on/off switching of the magnet coupling can be controlled by the electromagnetic clutch.

According to the magnet type fan clutch having the structure as above, the magnet coupling, i.e., the fan rotation can be controlled through the on/off control of the electromagnetic clutch. More over, since the on/off switching of the electromagnetic clutch is controlled in association with cooling water temperatures, throttle opening, engine rotational speeds, and switch status of the air conditioner, an excellent advantage of providing accurate and stable control over the fan rotation can be offered.

It is an object of the present invention to provide a method for controlling a magnet type fan clutch, by which method engine performance, fuel efficiency, engine life, vehicle acceleration capability and other properties of such a magnet type fan clutch as previously proposed by the applicant of the present invention can be further improved and fan noise of the magnet type fan clutch can be further reduced Provided according to the present invention is a method for controlling a magnet type fan clutch which includes a magnet coupling, an electromagnetic clutch combined with the magnet coupling to control the on/off switching of the magnet coupling, and a fan attached to the magnet coupling. The control method is characterized in that the electromagnetic clutch is turned on or off based on at least one signal of temperature of radiator coolant, engine oil and transmission oil, a vehicle speed, a rotational speed of an engine, compressor pressure of an air conditioner, and an on/off signal of the air conditioner, etc., so as to control the rotation of the fan.

In the control method, the electromagnetic clutch is turned on or off setting the on/off boundary at an optimum temperature range of the radiator coolant and/or the engine oil so as to control the fan rotation. Additionally, accelerations of engine rotation and/or accelerator opening at the time of vehicle acceleration are detected, and the electromagnetic clutch is temporarily turned off to control the fan rotation when the detected value exceeds a given value. Furthermore, switching on/off of the electromagnetic clutch is repeated a plurality of times at short intervals and subsequently the electromagnetic clutch is continuously turned on when continuous on-condition of the electromagnetic clutch is required.

BEST MODE FOR CARRY OUT THE INVENTION

Figure 1:
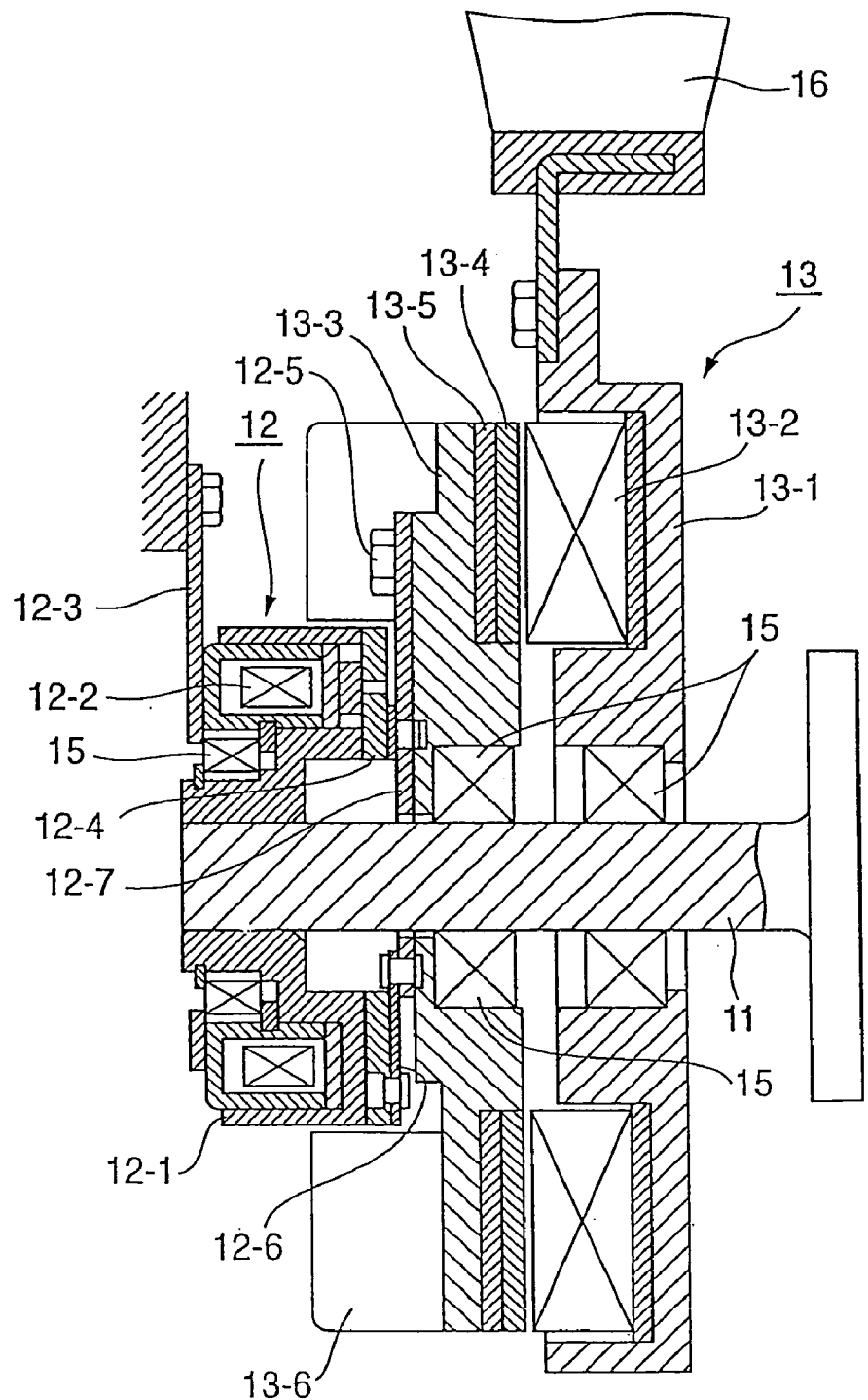
FIG. 1 is a longitudinal section view showing a magnet type fan clutch of as an embodiment according to the present invention.

According to the present invention, a magnet type fan clutch as illustrated in FIG. 1 contains an electromagnetic clutch 12 disposed on a single drive shaft 11 and a magnetic coupling 13. The electromagnetic clutch 12 includes: a clutch rotor 12-1 integrally supported on an end of the drive shaft 11; an exciting coil 12-2 which is fitted into the clutch rotor 12-1 in such a manner as to relatively rotate via a bearing unit 15 and also is secured to an external member through a bracket 12-3; and an armature 12-4 which is movable forward and backward and supported on a disc 13-3 at the exciting coil 12-2 side. The disc 13-3 is rotationally supported on the drive shaft 11 via the bearing unit 15. The armature 12-4 is attached to the clutch rotor 12-1 through a spring 12-6 an end of which is fixed to a stay 12-7. The stay 12-7 is fitted to the outer surface of the drive shaft 11 and an end of the stay 12-7 is secured to the disc 13-3 with a bolt 12-5. As for the magnet coupling 13, a fan 16 is attached to a permanent magnet rotating member 13-1 which is rotationally supported on the drive shaft 11 via the bearing unit 15 at the drive side opposite to the electromagnetic clutch 12. A conductor 13-4 opposed to a permanent magnet 13-2 fitted to the permanent magnet rotating member 13-1 with leaving a small gap between the conductor 13-4 and the permanent magnet 13-2 is attached to the disc 13-3 via a core 13-5. The permanent magnet rotating member 13-1 and the disc 13-3 rotate integrally or relatively due to suctional effect caused by eddy current between the permanent magnet 13-2 and the conductor 13-4. There is also provided a radiating fin 13-6.

In the magnet type fan clutch having the structure shown in FIG. 1, the electromagnetic clutch 12 is turned on while the drive shaft 11 is rotating. Then, the armature 12-4 supported on the disc 13-3 at the magnet coupling 13 side is sucked toward the clutch rotor 12-1 to be attached there to by the exciting coil 12-2 accommodated within the clutch rotor 12-1 which integrally rotates with the drive shaft 11. The clutch rotor 12-1, the armature 12-4 and the disc 13-3 thus rotate combinedly with one another. As the disc 13-3 rotates, the permanent magnet rotating member 13-1 and the fan 16 attached thereto start rotating due to the suctional effect generated between the conductor 13-4 attached to the disc 13-3 and the permanent magnet 13-2 of the permanent magnet rotating member 13-1. Since the magnet coupling 13 makes a cushioned start at this stage, the load applied when the electromagnetic clutch 12 is turned on is light and the fan noise produced is considerably reduced. When the electromagnetic clutch 12 is turned off, the armature 12-4 is separated from the clutch rotor 12-1 by the power of the spring 12-6, which considerably lowers the rotational speed of the disc 13-3 or stops its rotation. As a result, the rotational speed of the fan 16 considerably decreases or the fan 16 stops accordingly. In other words, the rotation of the fan 16 can be controlled by turning on or off the electromagnetic clutch 12.

Figure 2:
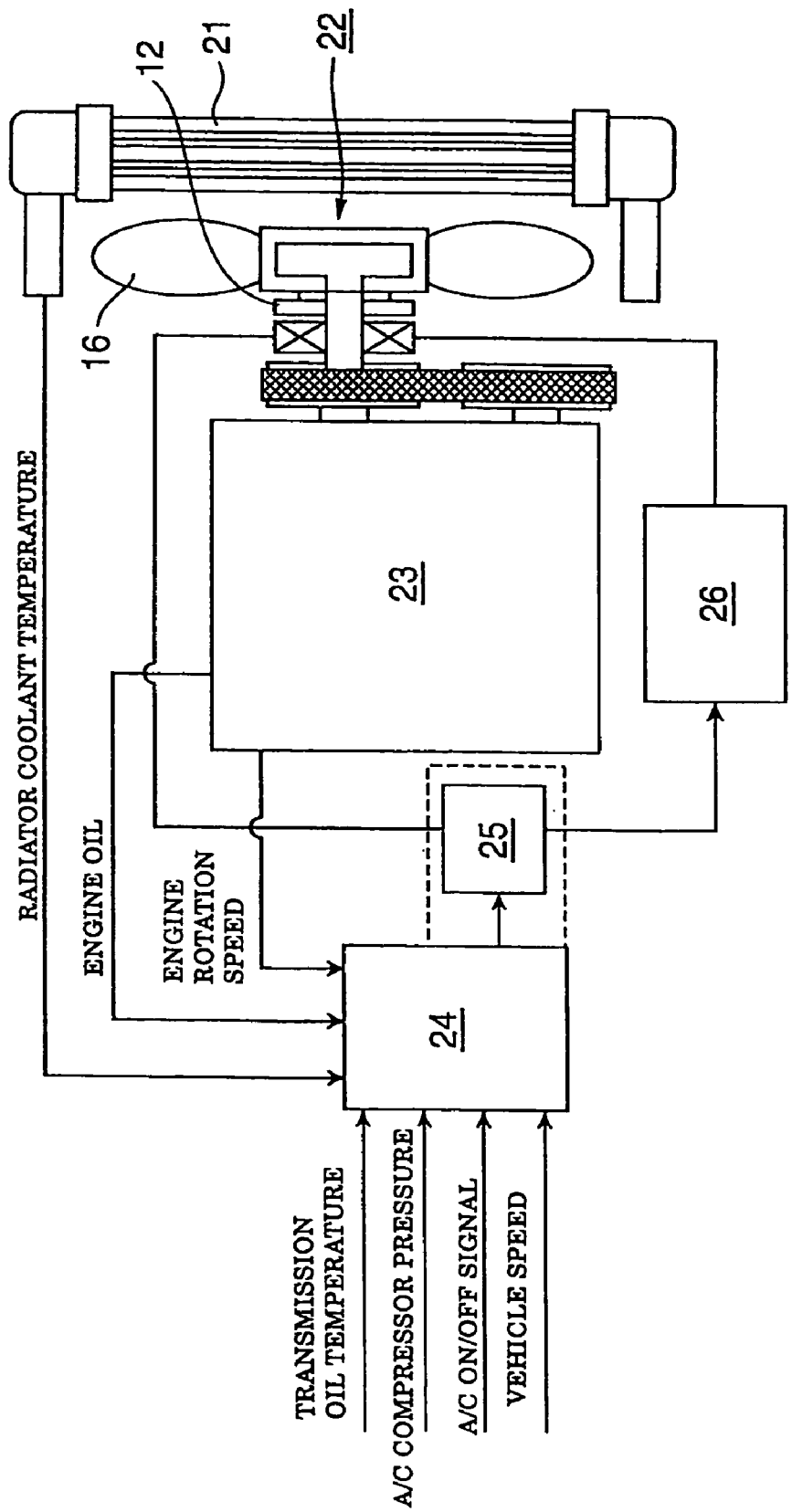
FIG. 2 schematically shows the entire structure of a control system as an embodiment employed in a method for controlling the above magnet type fan clutch.

Next, a control system employed in a method for controlling the above-described magnet type fan clutch is described in conjunction with FIG. 2.

A main arithmetic sequence unit 24 collects respective data of a coolant temperature at a radiator 21 (radiator coolant temperature), temperatures of engine oil in an engine 23 and of transmission oil, a vehicle speed, a rotational speed of the engine 23, compressor pressure of an air conditioner and an on/off signal of the air conditioner. The main arithmetic sequence unit 24 then infers the optimum temperature range of the radiator coolant and the engine oil and the acceleration range of the engine rotation, and sends a signal necessary for altering the fan rotation to a relay box 25. Switching is effected at this stage, supplying power to the electromagnetic clutch 12 of a magnet type fan clutch 22. Then, turning on/off of the electromagnetic clutch 12 is controlled, thereby providing optimum control over the temperatures of the radiator coolant and the engine oil, optimum control over the fan clutch at the time of vehicle acceleration, and the on/off control of the fan clutch. A battery 26 is also shown in the figure.

Needless to say, the magnet type fan clutch 22 is not limited to the type shown in FIG. 1, as described in JP-A-2002-195303.

A controlling method using the control system shown in FIG. 2 according to the present invention is now described with reference to FIGS. 3 through 6.

Figure 3:
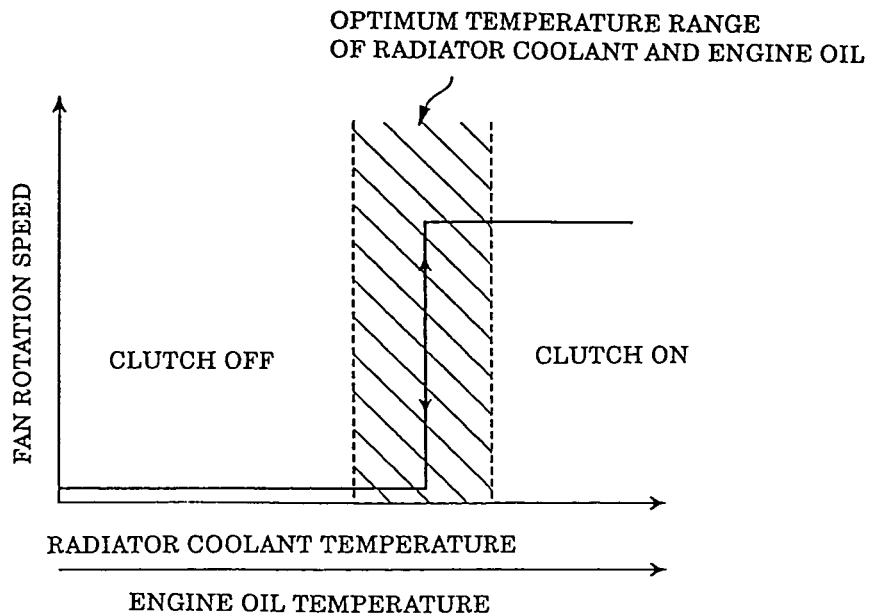
FIG. 3 shows an embodiment of a fan clutch control method using the control system in FIG. 2, indicating optimum control over temperatures of radiator coolant and engine oil.

FIG. 3 shows an embodiment method for controlling the fan clutch, indicating an optimum control over the temperatures of the radiator coolant and the engine oil. The optimum temperature range of the radiator coolant and/or the engine oil (the hatching portion in the figure) is determined based on the coolant temperature at the radiator 21 and the oil temperature of the engine 23 collected by the main arithmetic sequence unit 24 during running of a vehicle. The electromagnetic clutch 12 is turned on or off to increase or decrease the rotations of the fan setting the on/off boundary at the optimum temperature range, thereby stabilizing the temperatures of the radiator coolant and/or the engine oil. This control offers improvements in the fuel efficiency and the engine performance, and further elongation of the engine life.

FIG. 3 shows the embodiment in which the on/off switching is made at a temperature around the middle point in the optimum temperature range, but of course the switching may be made around the upper or lower limit of the optimum temperature range.

Figure 4:
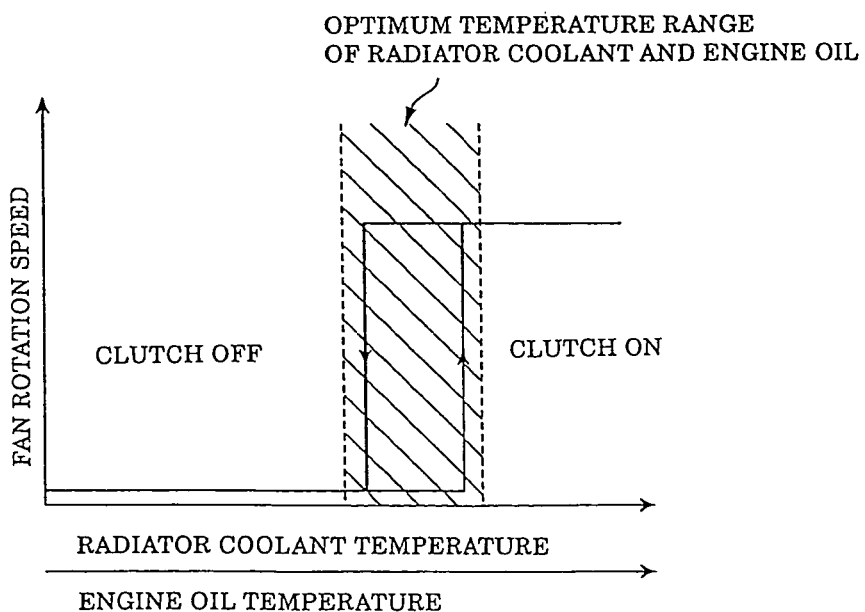
FIG. 4 shows another of the embodiment fan clutch control method shown in FIG. 3.

FIG. 4 shows another embodiment of the control method shown in FIG. 3. In this embodiment, the on/off threshold value established for the raised temperature of the radiator coolant and/or the engine oil is different from that value for the lowered temperature of the radiator coolant and/or the engine oil within the optimum temperature range (the hatching portion in the figure) so as to enlarge the time interval between turning on and off in this range. According to this control method, it is not necessary to repeat switching between on/off at short intervals.

Figure 5:
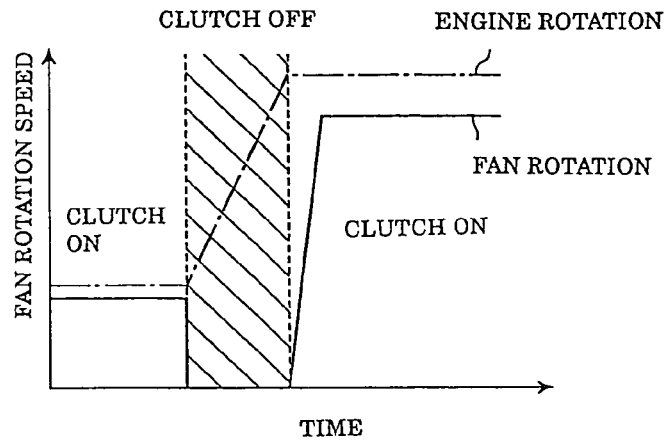
FIG. 5 shows an embodiment of a fan clutch control method using the control system in FIG. 2, indicating optimum control over the fan clutch at the time of vehicle acceleration.

FIG. 5 shows an embodiment method for optimizing control over the fan clutch at the time of the vehicle acceleration. In this embodiment, the acceleration of the engine revolution or the acceleration of the accelerator opening is detected based on the data of the vehicle speed and the rotational speed of the engine or the accelerator opening collected by the main arithmetic sequence unit 24. When the detected value exceeds a certain value, or during a certain time period and/or until the detected acceleration value decreases below a certain value (the hatching portion in the figure) if the above condition where the detected value exceeds the certain value continues for a certain time period, the electromagnetic clutch 12 is turned off so as to reduce the fan output which prevents vehicle acceleration and stabilize the engine revolution and the fan rotation. Consequently, the advantages of providing improvements in acceleration capability of a vehicle, reduction of fan noise produced due to fan rotation at the time of acceleration, and purification of exhaust gas can be offered.

Figure 6:
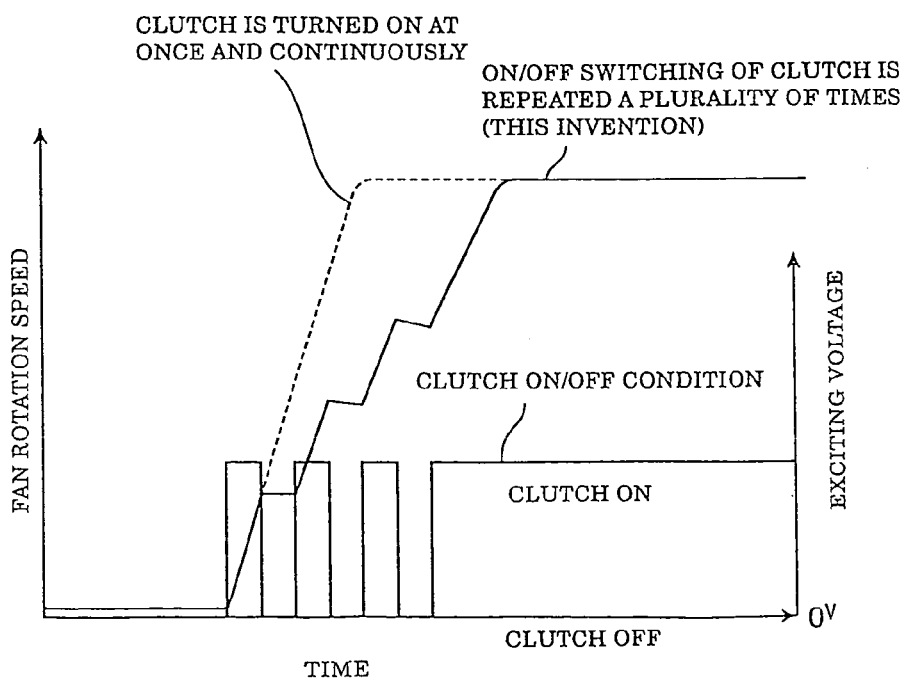
FIG. 6 shows an embodiment of a fan rotation control method using the control system in FIG. 2, illustrating fan clutch control by on/off switching of the fan clutch.

FIG. 6 shows an embodiment method for controlling on/off switching of the fan clutch. When the electromagnetic clutch 12 is turned on at once and continuously, the fan rotation is increased rapidly and large fan noise is produced instantly as shown by a broken line in the figure. However, if on/off switching of the electromagnetic clutch 12 is repeated a plurality of times at short time intervals such as 30 msec for effecting continuous turning on of the electromagnetic clutch 12, the rotational speed of the fan is not raised promptly to the highest but exhibits smooth increase as shown by a solid line in the figure. Thus, the cushioned starting is further improved and rapid production of fan noise is further prevented.

INDUSTRIAL APPLICABILITY

As aforementioned, in a magnet type fan clutch which includes a magnet coupling, an electromagnetic clutch combined with the magnet coupling to control the on/off switching of the magnet coupling, and a fan attached to the magnet coupling according to a method of the present invention, advantages such as improvements in fuel efficiency, engine performance, vehicle acceleration capability and elongation of engine life, reduction of fan noise generated due to fan rotation at acceleration, and purification of exhaust gas can be offered by controlling the electromagnetic clutch based on control parameters of respective temperatures of radiator coolant, engine oil and transmission oil, a vehicle speed, a rotational speed of an engine, compressor pressure of an air conditioner, and an on/off signal of the air conditioner.

The invention claimed is:

1. A method for controlling a fan clutch that comprises a magnet coupling, an electromagnetic clutch combined with said magnet coupling to control on/off switching of said magnet coupling, and a fan attached to said magnet coupling, the method comprising:

turning said electromagnetic clutch on or off based on at least one signal of temperature of radiator coolant, engine oil and transmission oil, a vehicle speed, a rotational speed of an engine, compressor pressure of an air conditioner, and an on/off signal of the air conditioner so as to control rotation of the fan and wherein switching on/off of said electromagnetic clutch is repeated a plurality of times at short intervals and subsequently said electromagnetic clutch is continuously turned on when continuous on-condition of the electromagnetic clutch is required.

2. The method for controlling the fan clutch as set forth in claim 1, wherein said electromagnetic clutch is turned on or off setting the on/off boundary at an optimum temperature range of the radiator coolant and/or the engine oil so as to control the fan rotation.

3. A method for controlling a fan clutch that comprises a magnet coupling, an electromagnetic clutch combined with said magnet coupling to control on/off switching of said magnet coupling, and a fan attached to said magnet coupling, the method comprising:

turning said electromagnetic clutch on or off based on at least one signal of temperature of radiator coolant, engine oil and transmission oil, a vehicle speed, a rotational speed of an engine, compressor pressure of an air conditioner, and an on/off signal of the air conditioner so as to control rotation of the fan and wherein switching on/off of said electromagnetic clutch is repeated a plurality of times at short intervals and subsequently said electromagnetic clutch is continuously turned on when continuous on-condition of the electromagnetic clutch is required;

detecting accelerations of engine rotation and/or accelerator opening at a time of vehicle acceleration; and temporarily turning said electromagnetic clutch off to control the fan rotation when a detected value exceeds a given value.

* * * * *